United States Patent
Otonari et al.

(10) Patent No.: US 9,838,328 B2
(45) Date of Patent: *Dec. 5, 2017

(54) RADIO COMMUNICATION APPARATUS

(71) Applicant: FUJITSU LIMITED, Kawasaki-shi, Kanagawa (JP)

(72) Inventors: Akihide Otonari, Fukuoka (JP); Yoshinori Soejima, Fukuoka (JP); Kazuhisa Obuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/204,026

(22) Filed: Jul. 7, 2016

(65) Prior Publication Data

US 2016/0315869 A1 Oct. 27, 2016

Related U.S. Application Data

(63) Continuation of application No. 13/924,995, filed on Jun. 24, 2013, now Pat. No. 9,419,705, which is a (Continued)

(30) Foreign Application Priority Data

Aug. 21, 2006 (JP) ................................ 2006-224107

(51) Int. Cl.
*H04L 12/801* (2013.01)
*H04L 1/18* (2006.01)
(Continued)

(52) U.S. Cl.
CPC ........... *H04L 47/34* (2013.01); *H04B 7/2603* (2013.01); *H04L 1/1812* (2013.01); *H04L 47/14* (2013.01);
(Continued)

(58) Field of Classification Search
None
See application file for complete search history.

(56) References Cited

U.S. PATENT DOCUMENTS 6,781,992 B1 8/2004 Rana et al.
7,154,873 B2 12/2006 Yi
(Continued)

FOREIGN PATENT DOCUMENTS

JP 11-215192 8/1999
JP 2002-527945 8/2002
(Continued)

OTHER PUBLICATIONS

ITU-T X.690, "Series X: Data Networks and Open System Communications—OSI networking and system aspects—Abstract Syntax Notation One (ASN.1 )", International Telecommunication Union, Jul. 2002, all pages.
(Continued)

*Primary Examiner* — Kwang B Yao
*Assistant Examiner* — Adam Duda
(74) *Attorney, Agent, or Firm* — Fujitsu Patent Center (57) ABSTRACT

A radio receiving apparatus for receiving the variable-length RLC PDU data in an RLC layer includes the buffer memory sectioned into a plurality of areas having a predetermined maximum data length of the RLC PDU data. By referring to a sequence number SN included in each received RLC PDU data, the radio receiving apparatus stores the RLC PDU data having an identical sequence number SN into an identical area, and assembles an RLC SDU data on a basis of the RLC PDU data stored in each area.

2 Claims, 9 Drawing Sheets

Related U.S. Application Data continuation of application No. 13/466,236, filed on May 8, 2012, now Pat. No. 8,509,264, which is a continuation of application No. 13/171,664, filed on Jun. 29, 2011, now Pat. No. 8,199,777, which is a continuation of application No. 11/889,833, filed on Aug. 16, 2007, now Pat. No. 8,000,348.

(51) Int. Cl.
*H04L 12/861* (2013.01)
*H04L 12/879* (2013.01)
*H04W 80/02* (2009.01)
*H04B 7/26* (2006.01)

(52) U.S. Cl.
CPC ............ *H04L 49/90* (2013.01); *H04L 49/901* (2013.01); *H04L 49/9094* (2013.01); *H04W 80/02* (2013.01)

(56) References Cited

U.S. PATENT DOCUMENTS

| | | | |
|---|---|---|---|
| 7,254,143 | B2 | 8/2007 | Jiang |
| 7,359,403 | B1 | 4/2008 | Rinne |
| 7,400,893 | B2 | 7/2008 | Yi et al. |
| 7,522,625 | B2 | 4/2009 | Abe et al. |
| 7,675,941 | B2 | 3/2010 | Kim et al. |
| 7,873,075 | B2 | 1/2011 | Rinne |
| 2003/0007480 | A1 | 1/2003 | Kim et al. |
| 2003/0156599 | A1 | 8/2003 | Casaccia et al. |
| 2004/0027999 | A1* | 2/2004 | Casaccia ................ H04L 1/08 370/312 |
| 2004/0085999 | A1 | 5/2004 | Burnett et al. |
| 2004/0114593 | A1 | 6/2004 | Dick et al. |
| 2006/0029102 | A1 | 2/2006 | Abe et al. |
| 2007/0041382 | A1 | 2/2007 | Vayanos et al. |

FOREIGN PATENT DOCUMENTS

| | | |
|---|---|---|
| JP | 2006-020044 | 1/2006 |
| JP | 2006-074726 | 3/2006 |
| WO | 00/21253 | 4/2000 |
| WO | 02-096006 | 11/2002 |
| WO | 2004-015906 | 2/2004 |

OTHER PUBLICATIONS

Extended European Search Report dated Jul. 22, 2013 for corresponding European Application No. 13163202.8.
European Search Report dated Mar. 6, 2013 for corresponding European Application No. 12198631.9.
Japanese Official Action dated Feb. 19, 2013 for corresponding Japanese Application No. 2011-232381, with partial English-language Translation.
Extended European Search Report dated May 16, 2012 for corresponding European Application No. 07114647.6.
Japanese Official Action dated Aug. 23, 2011 for corresponding Japanese Application No. 2006-224107, with English-language Translation.
USPTO, [Duda] "U.S. Appl. No. 13/924,995," Notice of Allowance and Notice of Allowability dated May 20, 2016 (allowed).
USPTO, [Duda] "U.S. Appl. No. 13/924,995," Non-Final Office Action dated Jan. 13, 2016 (allowed).
USPTO, [Duda] "U.S. Appl. No. 13/924,995," Final Office Action dated Sep. 3, 2015 (allowed).
USPTO, [Duda] "U.S. Appl. No. 13/924,995," Non-Final Office Action dated Apr. 10, 2015 (allowed).
USPTO, [Jackson] "U.S. Appl. No. 13/466,236," Notice of Allowance and Notice of Allowability dated Apr. 10, 2013 (Issued U.S. Pat. No. 8,509,264).
USPTO, [Jackson] "U.S. Appl. No. 13/466,236," Non-Final Office Action dated Dec. 4, 2012 (Issued U.S. Pat. No. 8,509,264).
USPTO, [Jackson] "U.S. Appl. No. 13/171,664," Non-Final Office Action dated Nov. 3, 2011 (Issued U.S. Pat. No. 8,199,777).
USPTO, [Jackson] "U.S. Appl. No. 13/171,664," Notice of Allowance and Notice of Allowability dated Mar. 6, 2012 (Issued U.S. Pat. No. 8,199,777).
USPTO, [Jackson] "U.S. Appl. No. 13/171,664," Supplemental Notice of Allowability dated Mar. 26, 2012 (Issued U.S. Pat. No. 8,199,777).
USPTO, [Jackson] "U.S. Appl. No. 11/889,833," Notice of Allowance and Notice of Allowability dated Apr. 1, 2011 (Issued U.S. Pat. No. 8,000,348).
USPTO, [Jackson] "U.S. Appl. No. 11/889,833," Non-Final Office Action dated Feb. 23, 2010 (Issued U.S. Pat. No. 8,000,348).
USPTO, [Jackson] "U.S. Appl. No. 11/889,833," Non-Final Office Action dated Oct. 22, 2010 (Issued U.S. Pat. No. 8,000,348).

* cited by examiner

```
            |←——————— 1500byte ———————→|
SN=0   | Data  | Data  |   Data    |         |
        SN=0,SI=0 SN=0,SI=2  SN=0,SI=1
SN=1   |   Data    |                         |
        SN=1,SI=0
SN=2   |                                     |
SN=3   |                                     |
```

(b) SN=0 Management memory

| SI=0 | address=0x0000 | length=0x0100 | LSI=0 |
| SI=2 | address=0x01A0 | length=0x0100 | LSI=1 |
| SI=1 | address=0x0100 | length=0x00A0 | LSI=0 |

RADIO COMMUNICATION APPARATUS

CROSS-REFERENCE TO RELATED APPLICATIONS

This application is a continuation of application Ser. No. 13/924,995 filed Jun. 24, 2013; which is a continuation of application Ser. No. 13/466,236 filed May 8, 2012; which is a continuation of application Ser. No. 13/171,664, filed Jun. 29, 2011; which is a continuation of application Ser. No. 11/889,833, filed Aug. 16, 2007; which is based upon and claims the benefit of priority from the prior Japanese Patent Application No. 2006-224107, filed on Aug. 21, 2006, the entire contents of which are incorporated herein by reference.

BACKGROUND OF THE INVENTION

1. Field of the Invention

The present invention relates to radio communication apparatus for transmitting and/or receiving a variable-length RLC PDU data in an RLC layer belonging to Layer 2 forming a radio communication protocol layer, and more particularly radio receiving apparatus enabling efficiently storage of a received RLC PDU data into a buffer memory.

2. Description of the Related Art

A W-CDMA system becomes widely used today, as a third generation (3G) radio communication system. Further, a standard called HSDPA (High-Speed Downlink Packet Access) comes into practical use to obtain high-speed (14 Mbps maximum) data communication in W-CDMA. HSDPA is also called as 3.5G system because of an improved version of the 3G system. The standardization is carried out by 3GPP (the 3rd Generation Partnership Project), an association for standardizing the 3G system.

HSDPA has the features of (1) shared use of one physical channel by a plurality of mobile terminals (UE) in time division, (2) automatic selection of higher speed modulation system and coding system depending on an electric wave condition, (3) adopting hybrid ARQ incorporating retransmission control (ARQ) combined with correction coding processing, and so on.

Figure 1:
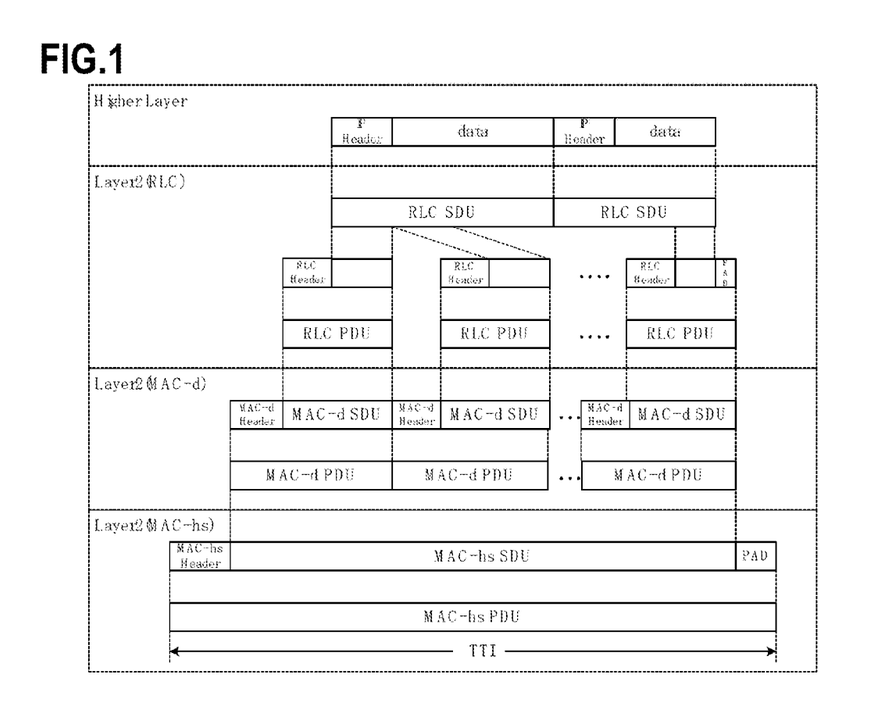
FIG. 1 shows a diagram illustrating a data structure of Layer 2 in the protocol architecture corresponding to HSDPA.

FIG. 1 shows a diagram illustrating a data structure of Layer 2 in the protocol architecture corresponding to HSDPA. Layer 2 is divided into sublayers of MAC (Medium Access Control)-hs, MAC-d, and RLC (Radio Link Control).

Figure 2:
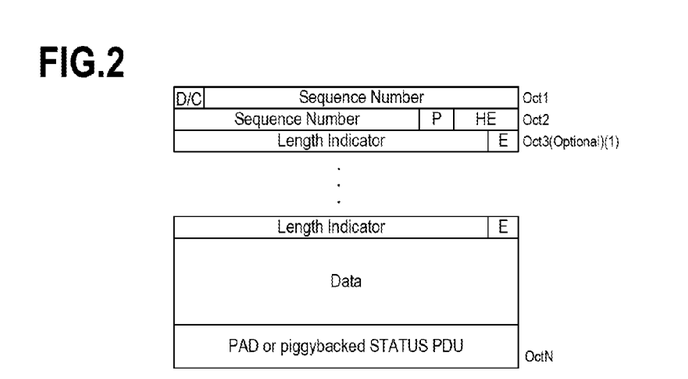
FIG. 2 shows a diagram illustrating an RLC PDU format.

FIG. 2 shows a diagram illustrating the format of RLC PDU (Protocol Data Unit). RLC PDU shown in FIG. 2 is an Acknowledge Mode RLC PDU enabling data delivery confirmation control and data retransmission control. RLC PDU includes D/C bit for distinguishing between a user data and a control data; a sequence number (SN) indicating the sequential order of RLC-PDU; polling bit P indicating the presence/non-presence of a delivery confirmation request; area HE indicating information of the user data extension area; length indicator LI; E bit; data storage area Data; and padding bit PAD or piggyback (Piggybacked STATUS PDU).

The data size of RLC PDU is fixed to, for example, 42 octets, 82 octets or 122 octets (where 1 octet is 8 bits), which is not changed during communication. RLC PDU is identified by the sequence number SN, which has a numeric value ranging from, for example, 0 to 4,095 maximum.

In RLC shown in FIG. 1, on the transmission side of RLC, a transmission data RLC SDU (Service Data Unit) fed from an upper layer is divided into a plurality of RLC PDUs, and forwarded to the lower MAC-d layer, after a sequence number SN is given to identify each RLC PDU.

Also, on the reception side of RLC, when the RLC PDUs are received from the lower MAC-d layer, by being sorted in order of the sequence number SN, the RLC PDUs are merged to assemble RLC SDU, and then transferred to the upper layer. At this time, when there is a missing sequence number SN, a retransmission request of RLC PDU corresponding to the missing SN is initiated.

Therefore, the transmission side of RLC is required to retain the transmitted RLC PDU in a buffer (memory) until the notification of delivery confirmation is received from the reception side of RLC. Also, the reception side of RLC is required to keep a buffer for the RLC PDU of which SN is missing, when performing RLC SDU assembly.

Figure 3:
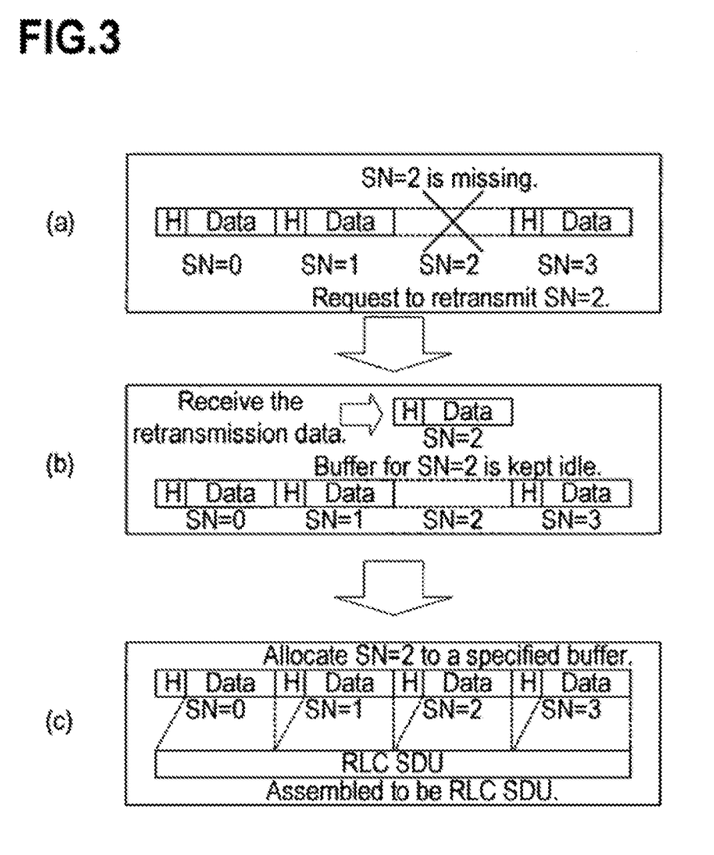
FIG. 3 shows a diagram illustrating the operation on the reception side of RLC in the HSDPA system specified by 3GPP.

FIG. 3 shows a diagram illustrating the operation on the reception side of RLC in the HSDPA system specified by 3GPP. In the present and subsequent figures, "H" denotes an RLC Header, and "Data" denotes a Payload.

When a missing sequence number is detected on the reception side of RLC, the transmission side is notified of the missing sequence number SN of the RLC PDU concerned, in the form of a retransmission request. As shown in FIG. 3(a), for example, SN=2 is missing, and the retransmission request therefor is initiated. At this time, on the reception side of RLC, a buffer area for originally storing RLC PDU of SN=2 is kept idle. The buffer size to be kept idle can easily be obtained because of the fixed length of RLC PDU. When the reception side of RLC receives RLC PDU of SN=2 as a retransmission data [refer to FIG. 3(b)], the received PDU is allocated in the buffer area having been kept idle for the PDU concerned, and the assembly of RLC SDU is performed [refer to FIG. 3(c)].

In Japanese laid-open Patent Publication No. 2006-20044, there is disclosed a memory management method in the MAC-hs sublayer, enabling reduction of the increase of the memory amount without need of a complicated memory control method, by dividing a variable-length MAC-hs PDU into each unit of RLC PDU and storing into a shared memory (buffer) together with a sequence number.

After the realization of the above-mentioned 3.5G mobile communication systems by HSDPA, subsequently, migration to the fourth generation (4G) systems will be expected in early stages so as to realize higher speed and larger capacity. However, in the present estimation, one more stage called as "3.9G" (which may also be called as "Super 3G") will be introduced before migration to 4G systems. As the communication speed of the 3.9G systems, a maximum speed of 100 Mbps, or of that order, is assumed.

In 3GPP at present, as the 3.9G specification, a study is in progress to modify RLC PDU from fixed length, as shown in FIGS. 1, 2, to variable length.

Figure 4:
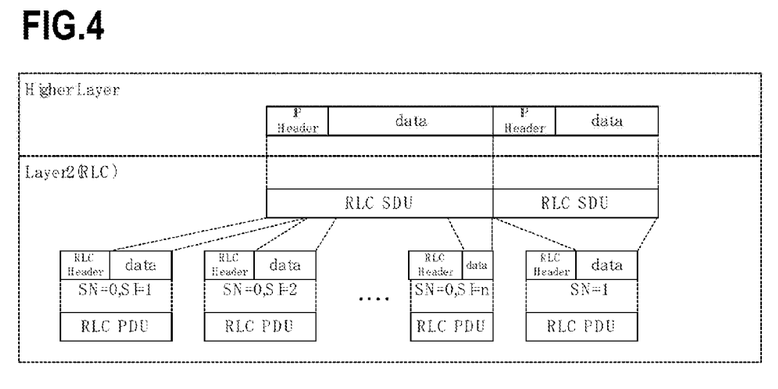
FIG. 4 shows a diagram illustrating an assumed configuration of the RLC sublayer when the RLC PDU is modified to have variable length.

FIG. 4 shows a diagram illustrating an assumed configuration of the RLC sublayer when the RLC PDU is modified to have variable length. As shown in FIG. 4, when the RLC PDU is modified to have variable length, the sequence number SN is used as a number to identify RLC SDU. To identify RLC PDU constituting each RLC SDU, assumedly, an SI (Segment Indicator) is introduced. In case of the fixed-length RLC PDU, the number of RLC PDUs constituting a fixed-length RLC SDU is uniquely determined. Accordingly, the RLC SDU can be identified when the RLC PDU is identified. However, when the RLC PDU is modified to have variable length, the number of RLC PDUs constituting each RLC SDU is not uniquely determined. Therefore, it becomes necessary to introduce any symbol so as to identify RLC SDU further. Thus, the sequence number SN conventionally used to identify each RLC PDU is used as a symbol to identify RLC SDU, and the aforementioned segment indicator SI is newly introduced as the symbol to identify RLC PDU.

Figure 5:
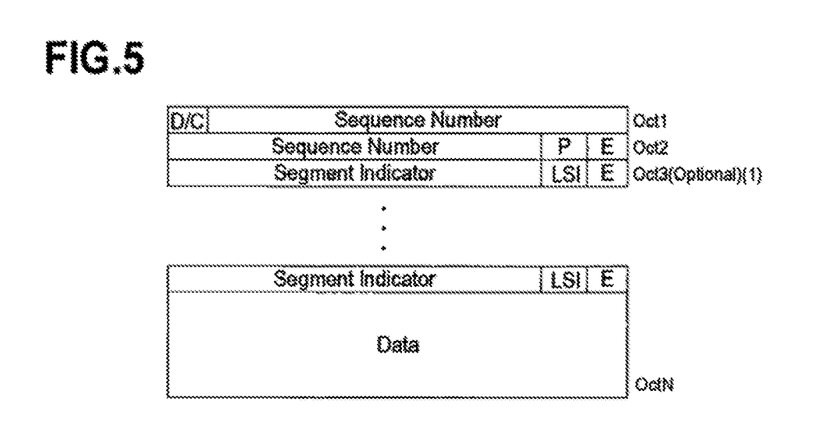
FIG. 5 shows an exemplary format when the RLC PDU is modified to have variable length.

FIG. 5 shows an exemplary format when RLC PDU is modified to have variable length. As described above, when RLC PDU is modified to have variable length, the sequence number SN becomes the number to identify RLC SDU, and RLC PDU is to be identified by the combination of the above sequence number SN and the segment indicator SI belonging thereto.

In the format, the reason for providing a plurality of areas for the segment indicator SI is that, when the RLC PDU being divided into a variable length is further divided, additional attachment of the segment indicator SI becomes necessary to identify further divided RLC PDU. At the retransmission control when RLC PDU is modified to have variable length, the following problem will be produced.

Figure 6:
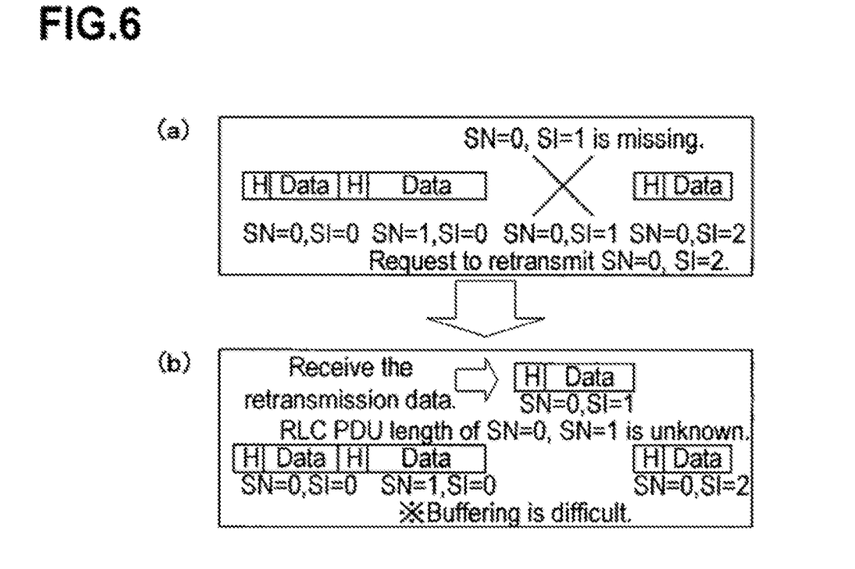
FIG. 6 shows a diagram explaining the operation on the reception side of RLC when the RLC PDU is modified to have variable length.

FIG. 6 shows a diagram explaining the operation on the reception side of RLC when the RLC PDU is modified to have variable length. When a missing RLC PDU is detected on the reception side of RLC, the transmission side is notified of both the sequence number SN and the segment indicator SI corresponding to the above missing RLC PDU, as a retransmission request. As shown in FIG. 6(a), for example, in case of a missing RLC PDU of SN=0, SI=1, the retransmission thereof is requested. At this time, because the data length of the missing RLC PDU is unknown, it is not possible to keep an idle buffer area for the missing RLC PDU so as to store RLC PDUs in order of the segment indicator SI [refer to FIG. 6(b)].

Assuming to keep the idle buffer area beforehand, it is necessary to assume to receive RLC PDU having a preset maximum length, which results in a high possibility of wasteful buffer area consumption.

In Patent document 1, a variable-length MAC-hs PDU is divided into each fixed-length RLC PDU, which does not produce any problem because the RLC PDU is divided later in the RLC sublayer. However, it is not possible to apply the same method in an upper layer than the RLC sublayer because of no data division performed. Also, in the high-speed communication such as Super 3G, efficient communication can be achieved by elongating each data length, and therefore, it is not preferable to introduce excessive division of data.

Figure 7:
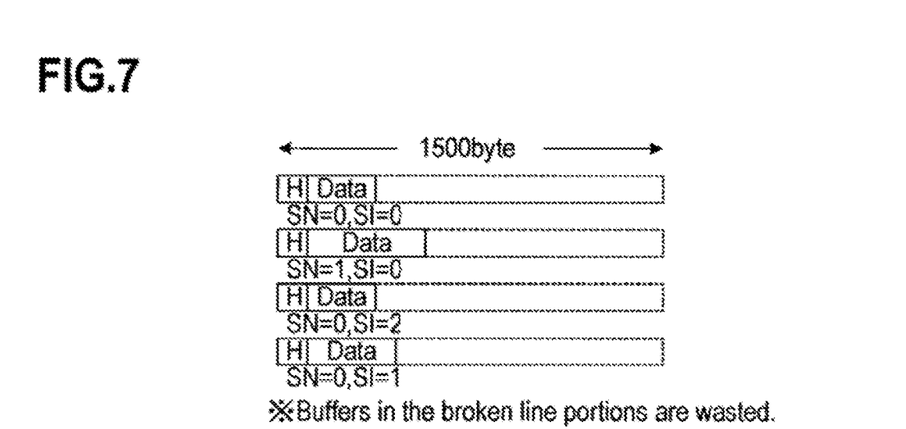
FIG. 7 shows a diagram explaining a use state of a buffer area considering the maximum length of the RLC PDU.

FIG. 7 shows a diagram explaining a use state of the buffer area considering the maximum length of the RLC PDU. For example, assuming the maximum length of the RLC PDU is 1,500 bytes, it is necessary to prepare a buffer area of 1,500 bytes for one RLC PDU. Thus, the buffer areas shown by the broken lines in the figure are wasted.

Also, when storing RLC PDUs in a packed manner in order of reception, RLC PDUs having an identical sequence number SN may not always be received consecutively. When RLC PDUs of different sequence numbers SN are received mixed, it is necessary to assemble RLC SDU after extracting RLC PDUs having an identical sequence number SN. Thus, the assembly to RLC SDU becomes complicated.

Accordingly, it is an object of the present invention to provide radio receiving apparatus in case of the variable-length RLC PDU, enabling efficient storage of received RLC PDUs into the buffer without wasting the buffer area.

SUMMARY OF THE INVENTION

As a first configuration of the radio receiving apparatus according to the present invention to achieve the aforementioned object, in the radio receiving apparatus which receives a variable-length RLC PDU data in an RLC layer belonging to Layer 2 forming a radio communication protocol layer, and assembles one RLC SDU data from one or a plurality of RLC PDU data, there are provided a buffer memory having a predetermined maximum data length of the RLC SDU data and being sectioned into a plurality of areas; and a controller referring to first sequence information included in the header of the received RLC PDU data, storing the RLC PDU data having the identical first sequence information into an identical buffer memory area, and assembling the RLC SDU data on a basis of the RLC PDU data stored in each area.

As a second configuration of the radio receiving apparatus according to the present invention, in the above first configuration, when storing the plurality of RLC PDU data into one buffer memory area, the controller stores the plurality of RLC PDU data into the above area in order of reception, and to assemble the RLC SDU data, the controller successively reads out the plurality of RLC PDU data in order of the sequence identified by second sequence information being included in each header of the plurality of RLC PDU data stored in the above area, sorts in order of the above sequence, and assembles the RLC SDU data.

As a third configuration of the radio receiving apparatus according to the present invention, in the above second configuration, there are provided a management memory storing the second sequence information, the top address and the data length of each RLC PDU data stored in each buffer memory area as a set of data, and the controller successively records the set of data including the second sequence information, the top address and the data length of each RLC PDU data, in order of reception of the plurality of RLC PDU data.

As a fourth configuration of the radio receiving apparatus according to the present invention, in the above third configuration, when the reception sequence of the plurality of RLC PDU data is continuous in the regular order of the second sequence information, with regard to the plurality of RLC PDU data having the consecutive second sequence information, the controller records into the management memory the second sequence information of the first RLC PDU data, the second sequence information of the last RLC PDU data, the top address of the first RLC PDU data, and the data length of the entire plurality of RLC PDU data having the consecutive second sequence information, as a set of data.

As a fifth configuration of the radio receiving apparatus according to the present invention, in the above second configuration, when storing the plurality of RLC PDU data into one buffer memory area, the controller stores into the buffer memory of which address is identified by the first sequence information and top address information included in each header of the above plurality of RLC PDU data, and reads out the plurality of RLC PDU data in order of storage of the plurality of RLC PDU data stored in the above area, and assembles the RLC SDU data, and further, the top address information is given according to the transmission sequence and the data length of the plurality of RLC PDU data.

As a sixth configuration of the radio receiving apparatus according to the present invention, in the above fifth configuration, on receiving through retransmission control an RLC PDU data having top address information identical to the buffer memory address in which the RLC PDU data is already stored, the controller overwrites the received RLC PDU data on the buffer memory address identified by the above top address information.

As a seventh configuration of the radio receiving apparatus according to the present invention, in the above first configuration, the first sequence information is a sequence number identifying an RLC SDU data.

According to the present invention, when the RLC PDU data in the RLC layer is modified to have variable length, a buffer memory for storing the RLC PDU data received in radio receiving apparatus can be used efficiently without being wasted.

DETAILED DESCRIPTION OF THE PREFERRED EMBODIMENTS

Figure 8:
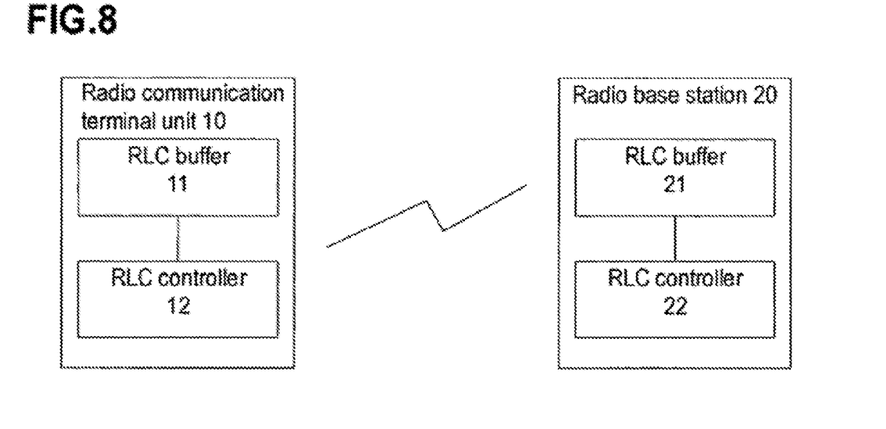
FIG. 8 shows a configuration diagram of radio receiving apparatus according to an embodiment of the present invention.

The preferred embodiments of the present invention are described hereinafter referring to the charts and drawings. However, the embodiments described below are not intended to limit the technical scope of the present invention. FIG. 8 shows a configuration diagram of radio receiving apparatus according to an embodiment of the present invention. The radio receiving apparatus is a radio communication terminal unit 10 or a radio base station unit 20. Radio communication terminal unit 10 and radio base station unit 20 respectively includes RLC buffers 11, 21, and RLC controllers 12, 22 for performing readout control and write control thereto. The embodiment described in the following is a buffer configuration and buffer control on the reception side of RLC. In case of application to a downlink such as HSDPA, radio communication terminal unit 10 is the radio receiving apparatus of the present invention. Meanwhile, in case of application to an uplink such as HSUPA, radio base station unit 20 is the radio receiving apparatus of the present invention. Hereafter, the description is made using RLC buffer 11 and RLC controller 12 of radio communication terminal unit 10 as an example. However, the embodiment of the present invention is also applicable to RLC buffer 21 and RLC controller 22 of radio base station unit 20. RLC controllers 12, 22 may be configured of either hardware or software, or the combination thereof.

Figure 9:
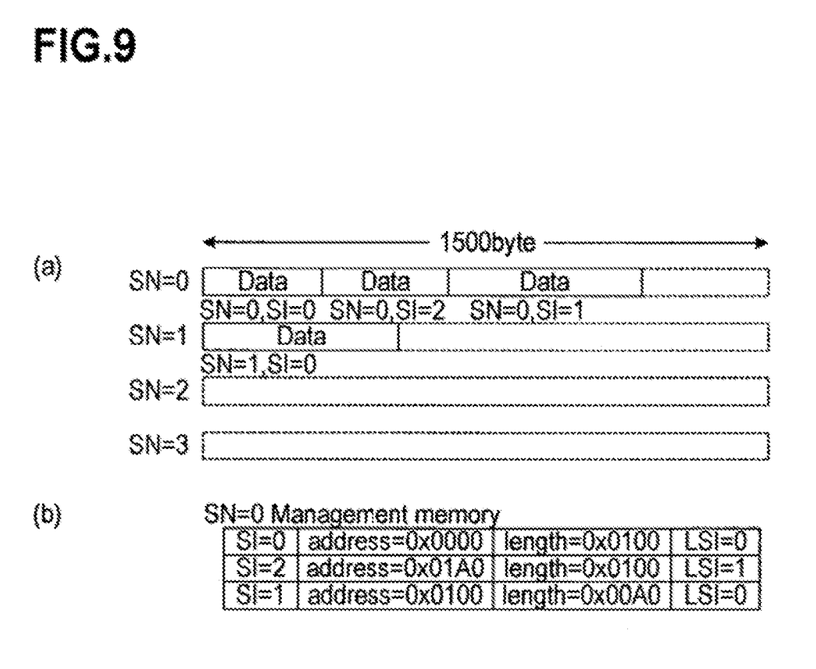
FIG. 9 shows a diagram illustrating an exemplary configuration of an RLC buffer according to an embodiment of the present invention.

FIG. 9 shows a diagram illustrating an exemplary configuration of the RLC buffer according to the embodiment of the present invention. RLC buffer 11 is sectioned on a basis of the sequence number SN identifying an RLC SDU. For each SN, a buffer amount having a predetermined maximum RLC SDU length (for example, 1,500 bytes) is given.

RLC PDUs are transmitted in the format shown in the above FIG. 5, having a header including a sequence number SN and a segment indicator SI. When receiving the RLC PDUs, RLC controller 12 refers to the sequence number SN included in the header of each RLC PDU, distributes the RLC PDUs on a basis of SN, and stores the received RLC PDUs into each buffer area assigned to each SN.

Because the maximum length of each RLC PDU is predetermined, by distributing the RLC PDUs on a basis of each sequence number identifying each RLC SDU, the RLC PDUs can be efficiently stored into RLC buffer 11 without considering the data lengths of the variable-length RLC PDUs. Typically, by distributing the RLC PDUs on a basis of each SN, a plurality of RLC PDUs can be stored on a basis of each sequence number. As long as the sequence number SN is identical, the data length of the entire RLC PDUs having the identical sequence number SN can be stored without exceeding the maximum RLC SDU length. Thus, it is possible to store the variable-length RLC PDUs into RLC buffer 11 as efficiently as possible.

In FIG. 9(a), it is assumed that the RLC PDUs are received in order of (1) SN=0, SI=0, (2) SN=1, SI=0, (3) SN=0, SI=2, and (4) SN=0, SI=1, similar to FIG. 6. Then, the RLC PDUs of (1) SN=0, SI=0, (3) SN=0, SI=2, and (4) SN=0, SI=1 are stored into an area assigned to SN=0 in RLC buffer 11 in order of reception, while the RLC PDU of (2) SN=1, SI=0 is stored into an area assigned to SN=1 in RLC buffer 11. The RLC PDUs of (3) SN=0, SI=2, and (4) SN=0, SI=1 are stored in order of reception, though the reception sequence is reversed due to retransmission.

FIG. 9(b) is information stored in the management memory for managing RLC buffer 11. The management memory is, for example, an internal memory of RLC controller 12. Or, a portion of the area of RLC buffer 11 may be used as management memory. Or otherwise, it may also be possible to provide a dedicated memory for the management memory.

In the management memory also, the RLC PDUs stored in RLC buffer 11 are managed on a basis of each sequence number SN. In the management memory, there are stored a top address, a data length, and bit information (LSI: Last Segment Indicator) indicative of the last segment indicator SI in the sequence number SN concerned, for each segment indicator SI of RLC PDU.

For each sequence number SN, when the entire RLC PDUs up to the RLC PDU of LSI=1, having the last segment indicator SI, are completely stored in RLC buffer 11, RLC controller 12 refers to the management memory shown in FIG. 9(b), and reads out from the top address of each RLC PDU in order of the segment indicator SI. Thus, RLC controller 12 sorts RLC PDUs in order of the segment indicator SI, and assembles an RLC SDU.

In FIG. 9(a), with regard to the RLC PDUs having a sequence number SN=0, RLC controller 12 reads out in order of the segment indicator SI, namely, in order of (1) SN=0, SI=0, (4) SN=0, SI=1 and (3) SN=0, SI=2, so as to assemble the RLC SDU.

Figure 10:
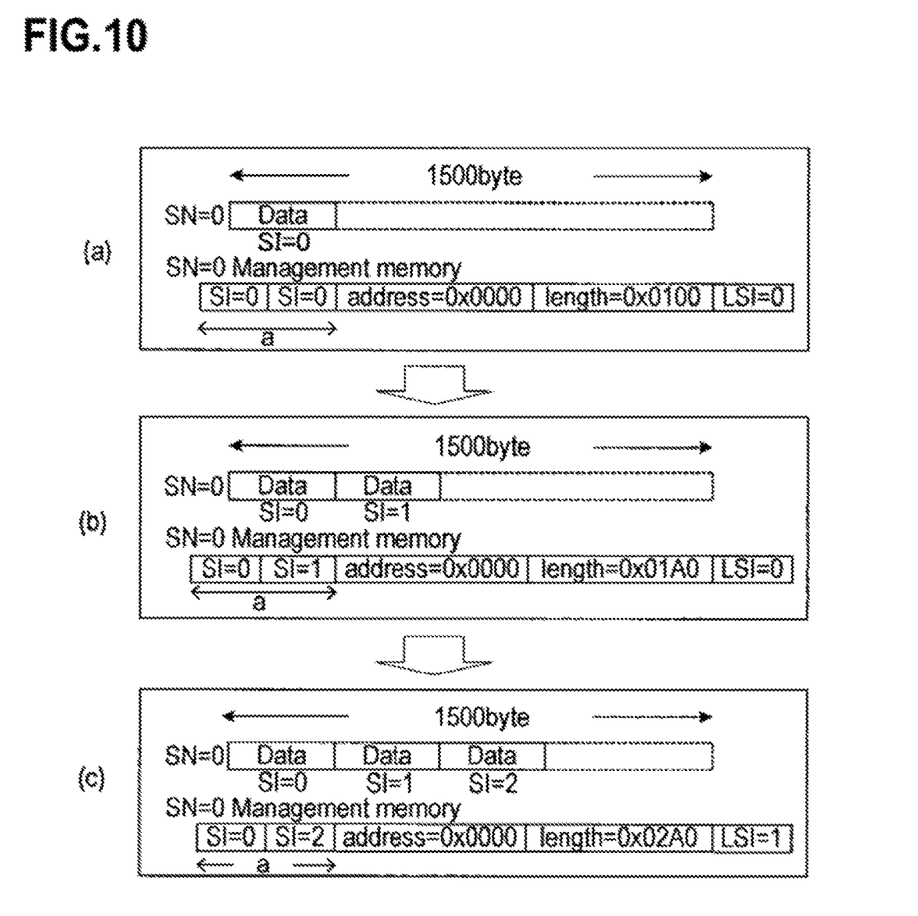
FIG. 10 shows a diagram illustrating another management form using a management memory for managing the RLC PDUs being stored in an RLC buffer 11 on a basis of the sequence number SN.

FIG. 10 shows a diagram illustrating another management form using a management memory for managing the RLC PDUs being stored in an RLC buffer 11 on a basis of each sequence number SN. The management memory shown in FIG. 10 includes an area capable of storing a range having consecutive segment indicators SI. An area "a" stores the first SI and the last SI of the consecutive segment indicators SI. As shown in FIG. 10(a), as to an RLC PDU having a sequence number SN=0, when the RLC PDU having SI=0 is received, an identical SI=0 is stored in the area "a" as the consecutive first SI and the last SI because only one RLC PDU has been received so far. Also, the top address of the RLC PDU having SI=0 is stored, together with the data length thereof.

Subsequently, when an RLC PDU having SI=1 consecutive from SI=0 is received, in the area "a", there are stored SI=0 as the first consecutive SI, and SI=1 as the last SI. The top address remains the top address of the RLC PDU having SI=0, and as the data length, a total data length of the RLC PDU having SI=0 and the RLC PDU having SI=1 is stored.

When RLC PDUs are received in order of the segment indicator SI, and stored in RLC buffer 11 in order of the segment indicator SI, the consecutive plurality of RLC PDU can be read out by specifying the top address and the data length. Thus, it is possible to manage the RLC PDUs stored in RLC buffer 11 with a smaller amount of data, as compared to storing the top address and the data length for each segment indicator SI, by which the memory capacity of the management memory can be reduced. In case of FIG. 10(b), by storing the top address of SI=0 and the total data length of SI=0 and SI=1, it is possible to manage two RLC PDU of SI=0 and SI=1 which are stored consecutively using one set of data.

In FIG. 10(c), further, an RLC PDU having SI=2 consecutive from SI=1 is received, and in the area "a", there are stored SI=0 as the consecutive first SI, and SI=2 as the last SI. As the top address remains the top address of the RLC PDU having SI=0, and as data length, the total data length of RLC PDU from SI=0 to SI=2. As such, as long as the segment indicators SI are consecutive, it is possible to manage the plurality of RLC PDUs consecutively stored, using one set of data, and thus, the memory capacity of the management memory can be reduced.

Figure 11:
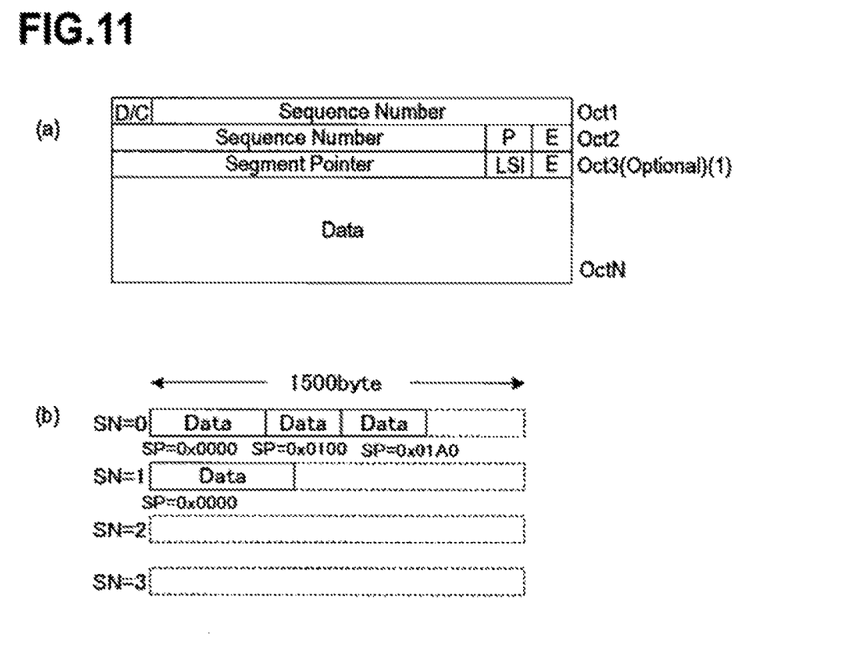
FIG. 11 shows a diagram illustrating another exemplary RLC PDU format and an exemplary RLC buffer configuration according to an embodiment of the present invention.

FIG. 11 shows a diagram illustrating another exemplary RLC PDU format and an exemplary RLC buffer configuration according to an embodiment of the present invention. In the exemplary RLC PDU format shown in FIG. 11(a), a segment pointer SP is employed in place of the segment indicator SI shown in FIG. 5. The segment pointer SP is an offset address from the top address of each buffer area of RLC buffer 11 for each sequence number SN.

RLC buffer 11 is sectioned in advance on a basis of the maximum length of the RLC PDU (for example, 1,500 bytes), and the address range of the buffer area corresponding to each sequence number can be identified. Accordingly, by specifying the storage positions of the plurality of RLC PDUs for each sequence number SN by use of the address, each RLC PDU can be stored in order, even if the RLC PDU has variable length.

As shown in FIG. 11(b), for example, with regard to the sequence number SN=0, when RLC PDUs specified by the segment pointers (1) SP=0x0000, (2) SP=0x0100 and (3) SP=0x01A0 are received, the storage is performed into the buffer area of SN=0, using each address specified by each segment pointer SP as top address. Even when the reception sequence is not the original sequence of (1), (2), (3), but the reception is made, for example, in order of (1), (3), (2), RLC controller 12 stores the RLC PDU of (1) SP=0x0000 into the address specified by the segment pointer SP, and also stores the next received RLC PDU of (3) SP=0x01A0 into the address specified by the segment pointer SP. At this time, in the buffer area, there is an idle buffer area for the RLC PDU of (2) SP=0x0100 between the RLC PDU of (1) SP=0x0000 and the RLC PDU of (3) SP=0x01A0. On receipt of the RLC PDU of (2) SP=0x0100, the storage is made in the address specified by the segment pointer SP (2) SP=0x0100, and thus, the RLC PDUs are stored in the buffer area in order of (1) SP=0x0000, (2) SP=0x0100 and (3) SP=0x01A0.

In the format shown in FIG. 11(a), an LSI bit defined next to the segment pointer SP is a bit for identifying the last RLC PDU among RLC PDUs of each sequence number SN. RLC controller 12 recognizes that the RLC PDU having LSI=1 is the last RLC PDU of the sequence number SN concerned, and confirms whether or not the entire RLC PDUs corresponding to the sequence number SN have already been received and stored in the areas preceding the storage position of the RLC PDU having LSI=1, of the buffer area of the sequence number SN concerned. When the entire RLC PDUs are already stored, RLC controller 12 reads out in the regular order of the storage, and assembles RLC SDU. When the entire RLC PDUs are not stored yet, RLC controller 12 performs processing to store the entire RLC PDUs by standing by further, or initiating a retransmission request, or the like.

As such, by identifying each RLC PDU and storing into the buffer area using the segment pointer SP, that is, the top address in which each RLC PDU is stored in the buffer area, it is possible to store the RLC PDUs into RLC buffer 11 in order of transmission. Namely, even when the reception sequence is replaced, it is possible to store in order of transmission.

Also, when a portion of the RLC PDUs is/are not received, RLC controller 12 initiates a retransmission request of the above RLC PDU(s) to the transmission side. When the RLC PDU of interest is received with delay after the initiation of the retransmission request, an identical RLC PDU is received twice, based on the above retransmission request. In the above case, the identity decision is made, for example, by comparing information identifying each RLC PDU such as the segment indicator SI. In case of being identical, it becomes necessary to discard one. However, such the above discard processing becomes unnecessary when using the segment pointer SP.

Namely, even when an identical RLC PDU is received twice, by overwriting in the address specified by the segment pointer SP, only one of the identical RLC PDUs can be stored automatically. Thus, the identity decision processing of the two RLC PDUs and the discard processing become unnecessary.

Also, when the retransmission request is made, there is a case of transmission by being divided further at the time of the retransmission. In such a case, it becomes necessary to form the segment indicator SI with a hierarchical structure (for example, assuming the segment indicator of RLC PDU being retransmission requested to be SI=1, the segment indicators of the two RLC PDUs further divided and retransmitted are set to be SI=1-1 and SI=1-2, or the like), and to add the segment indicator SI area in the header.

In contrast, when using the segment pointer SP, even when the RLC PDU to be retransmitted is further divided, the top address of the buffer area to store each divided RLC PDU may be specified as segment pointer SP. Thus, no additional header area is needed, and instead, only to store each RLC PDU into the address specified by the segment pointer SP is needed. Moreover, even when the divided data length of each RLC PDU is unknown because of the redivision, it is not necessary to modify the configuration of RLC buffer 11.

The foregoing description of the embodiments is not intended to limit the invention to the one details of the examples illustrated. Any suitable modification and equivalents may be resorted to the scope of the invention. All features and advantages of the invention which fall within the scope of the invention are covered by the appended claims.

What is claimed is:

1. A radio transmission apparatus for transmitting data to a radio reception apparatus, the radio transmission apparatus comprising:
    a processor configured to add a sequential number, offset information and divided information to each of a plurality of divided data which is generated by dividing the data to be retransmitted; and
    a transmitter configured to transmit the plurality of divided data including the sequential number, the offset information and the divided information to the radio reception apparatus,
    wherein the offset information indicates a position within the data to which a head of the divided data corresponds, the divided information indicates whether each of the plurality of the divided data is last data in the plurality of the divided data, and the sequential number identifying the data to be retransmitted.

2. A communication system having a radio reception apparatus and a radio transmission apparatus for transmitting data to the radio reception apparatus,
    the radio transmission apparatus comprising:
    a processor configured to add a sequential number, offset information and divided information to each of a plurality of divided data which is generated by dividing the data to be retransmitted; and
    a transmitter configured to transmit the plurality of divided data including the sequential number, the offset information and the divided information to the radio reception apparatus,
    the radio reception apparatus comprising:
    a receiver configured to receiving the divided data including the sequential number, the offset information and the divided information from the radio transmission apparatus,
    wherein the offset information indicates a position within the data to which a head of the divided data corresponds, the divided information indicates whether each of the plurality of the divided data is last data in the plurality of the divided data, and the sequential number identifying the data to be retransmitted.

* * * * *